July 4, 1933.  B. C. VON PLATEN ET AL  1,916,240
ELECTRIC MACHINE
Filed Oct. 16, 1928  6 Sheets-Sheet 2

INVENTORS
Baltzar Carl von Platen
Lars Arvid Gunnar Reiland
by ATTORNEY

INVENTORS
Baltzar Carl von Platen
Lars Arvid Gunnar Reiland by
ATTORNEY

July 4, 1933.  B. C. VON PLATEN ET AL  1,916,240
ELECTRIC MACHINE
Filed Oct. 16, 1928   6 Sheets-Sheet 4

Fig. 7.

Fig. 8.   Fig. 9.

INVENTORS
Baltzar Carl von Platen
Lars Arvid Gunnar Reiland
by
ATTORNEY

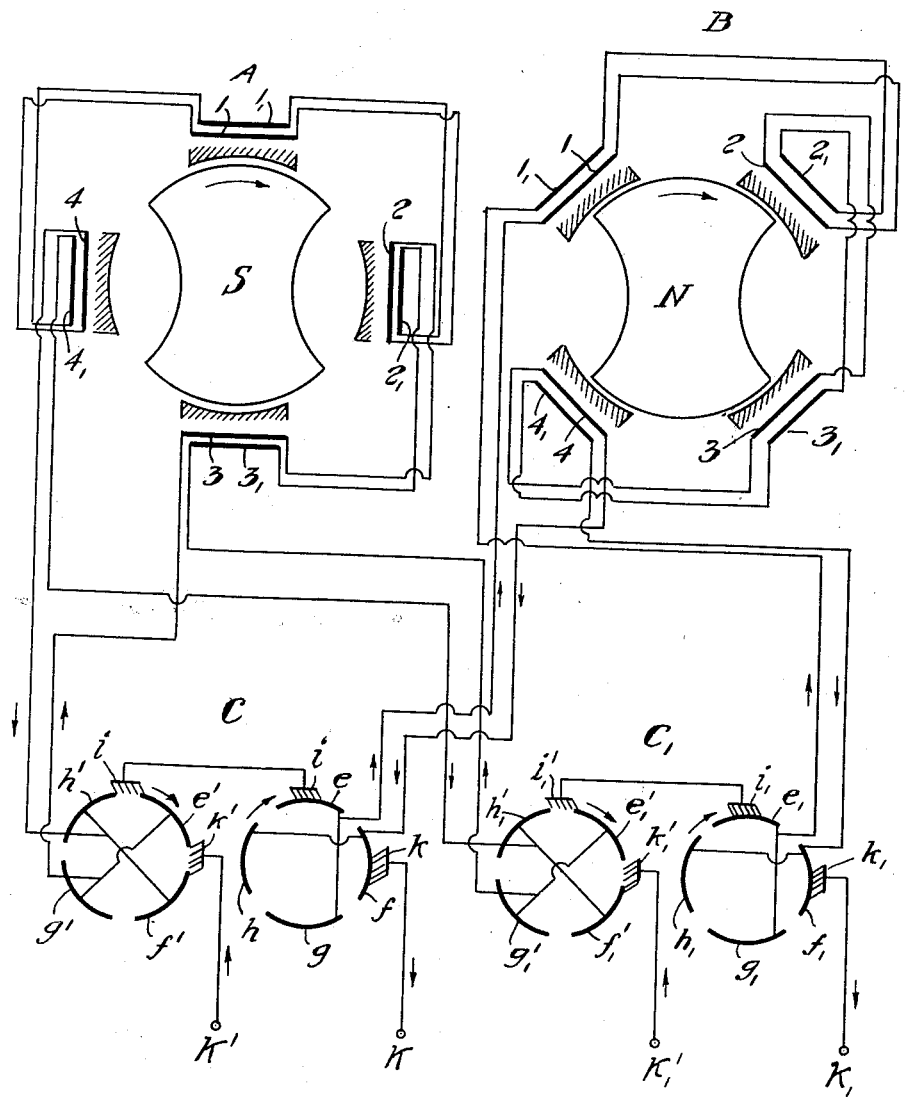

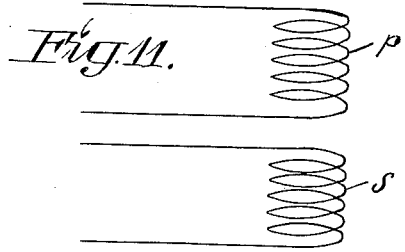
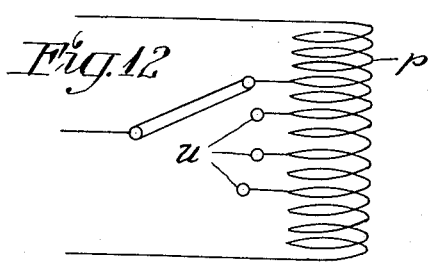
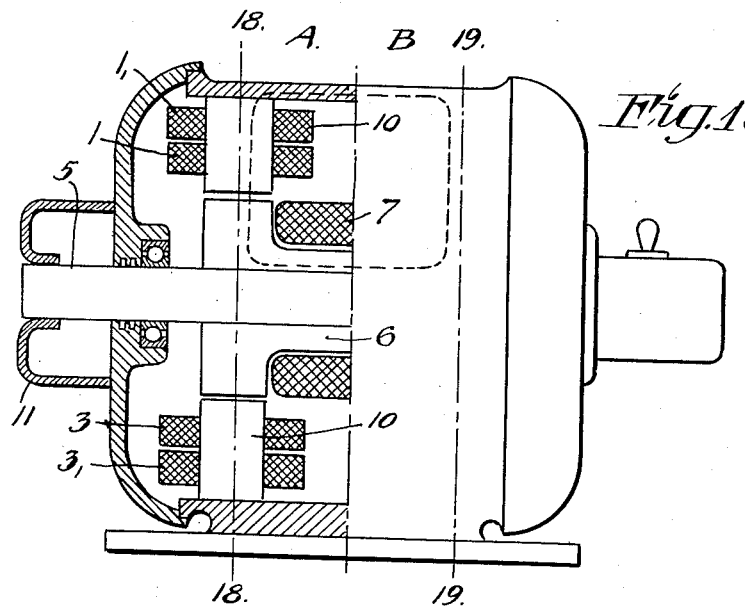
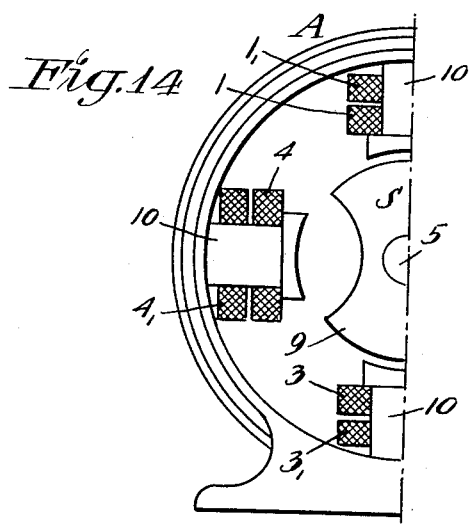
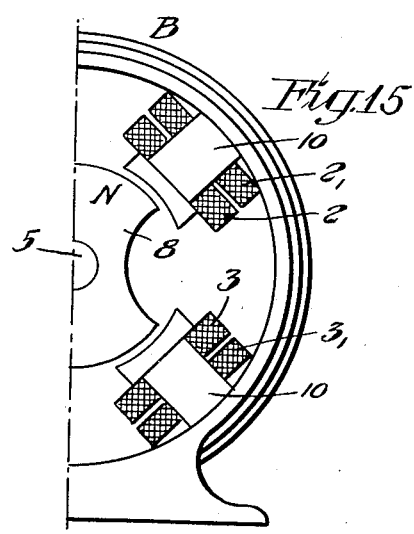

Patented July 4, 1933

1,916,240

UNITED STATES PATENT OFFICE

BALTZAR CARL von PLATEN AND LARS ARVID GUNNAR REILAND, OF STOCKHOLM, SWEDEN

ELECTRIC MACHINE

Application filed October 16, 1928, Serial No. 312,913, and in Sweden October 24, 1927.

The present invention relates to electric generators, motors or transformers of the direct current type and the object thereof is to make it possible to build such machines for very high voltages, for instance up to 100,000 volts and more.

The invention consists essentially in the provision in such electric machines of at least two separate stationary armature windings and, if desired, also of stationary field windings, and of a number of separate commutators corresponding to the number of armature windings and connected thereto.

By such means it will be possible, contrary to the case in ordinary direct current machines having rotary armature windings, to effectively insulate such windings. This is particularly conducive to the use of very high direct current voltages.

The invention will be more fully described with reference to the accompanying drawings, and in connection with the description of the embodiments shown in these drawings other characteristic features of the invention will be given.

Figure 1:
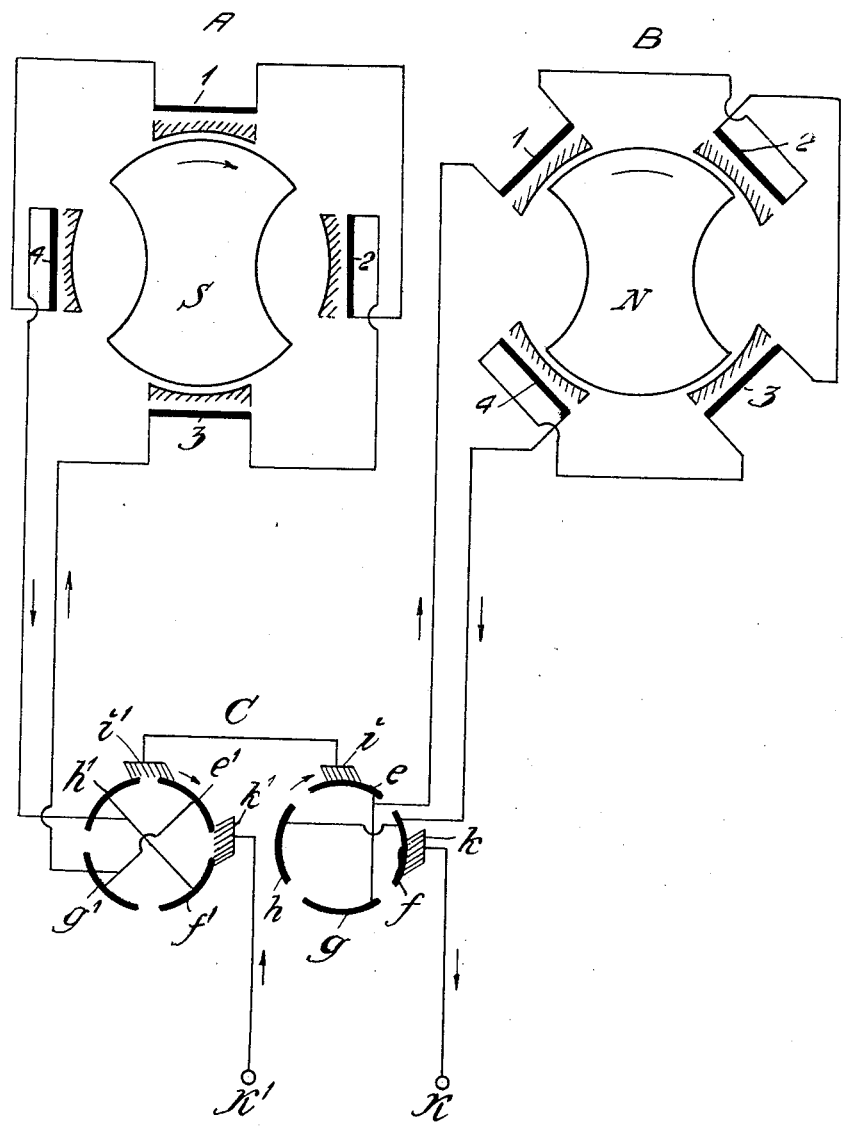
Figure 2:
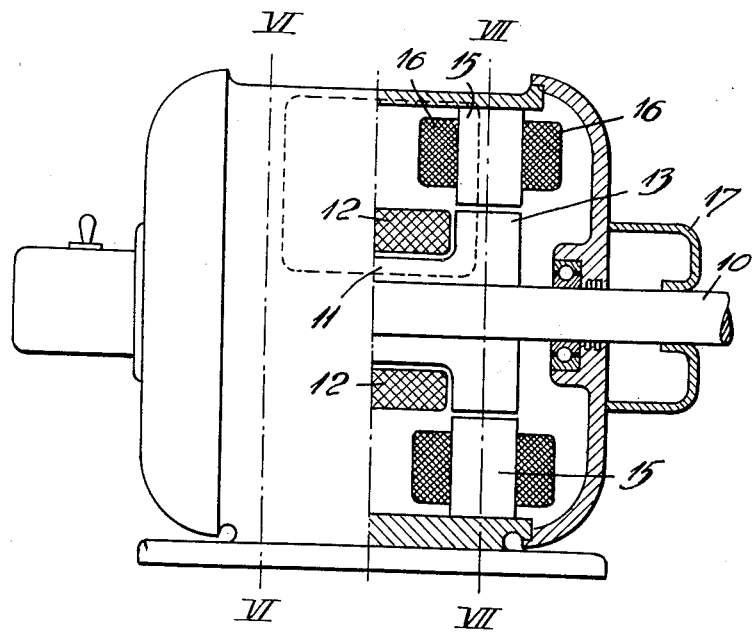
Figure 3:
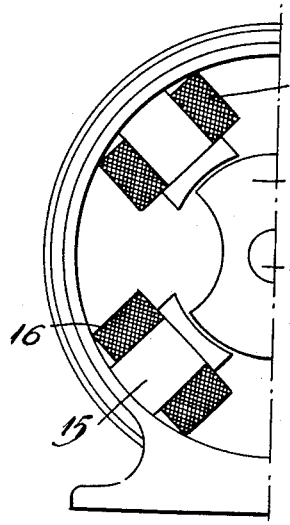
Figure 4:
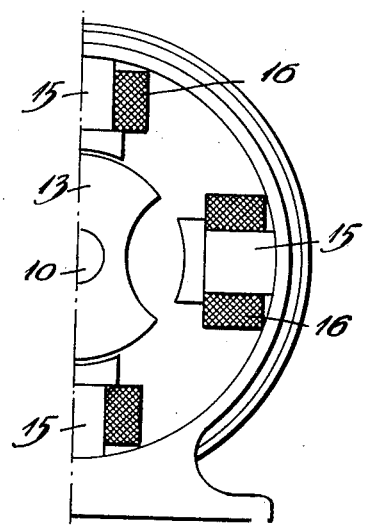
Figure 5:
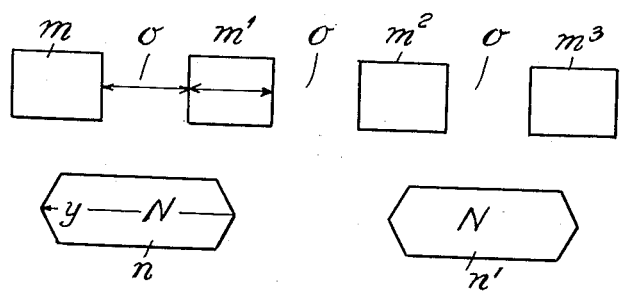
Figure 6:
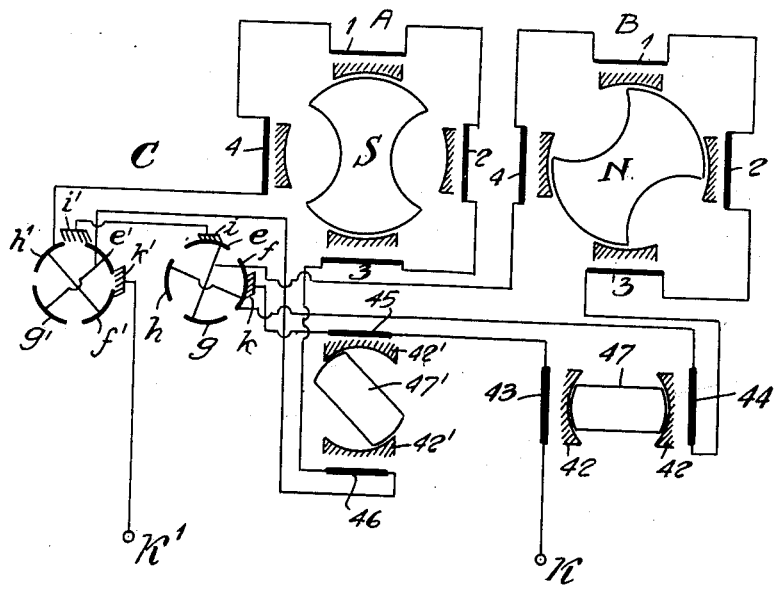

In the accompanying drawings Fig. 1 shows a diagram of connections for an embodiment of an electric machine according to the invention. Fig. 2 shows this machine in longitudinal section and Figs. 3 and 4 are cross sections through VI—VI and VII—VII in Fig. 2, only one half of the machine being shown for the sake of simplicity. Fig. 5 is a diagram illustrating as an example how the pass-over surfaces for the flow of the magnetic flux between stator and rotor in this machine may be dimensioned. Fig. 6 shows a diagram of connections for this machine and Fig. 7 shows the machine in longitudinal section. Figs 8 and 9 are sections through XII—XII and XIII—XIII in Fig. 7, only one half of the machine being shown as before. Figs. 10-15 show a direct current transformer according to the invention. Fig. 10 is a diagram of connections for this machine. Figs. 11 and 12 show two different methods of carrying out the connections for the primary and the secondary windings. Fig. 13 is a longitudinal section of the machine, and Figs. 14 and 15 are cross-sections through 18—18 and 19—19 in Fig. 13, only one half of the machine being shown in each of these figures for the sake of simplicity.

In Fig. 1, N is a rotating north pole and S a rotating south pole, the lines of force flowing outwards from the first one and towards the latter one, and which rotate in synchronism, for instance by being mechanically connected with each other. This flow of magnetic lines of force may be obtained by means of a winding of any known type or the poles may be those of a permanent magnet. The stator consists of two identical halves displaced a certain angle in relation to each other, for instance 45°, which in the figure are denoted with A and B. Placed on the said stator halves are armature windings 1, 2, 3 and 4 of the open coil type. The windings belonging to the half A of the stator will in the following be denoted with $A^1$, $A^2$ etc. and the windings belonging to the half B of the stator with $B^1$, $B^2$ etc. Within these windings there are the iron cores of the stator halves, through which the magnetic flux passes when the poles are in an appropriate position. The windings in each half of the stator are connected together and connected with a commutator arrangement C. This latter consists of two parts, each part comprising four sections separated from each other, for instance slip-ring segments, denoted with for instance $e$, $f$, $g$, $h$, and $e^1$, $f^1$, $g^1$ $h^1$ respectively. The sections placed diametrically opposite each other are connected with each other and the windings $A^1$ etc. $B^1$ etc. are joined to these connections. Against the commutator sections rest the contact brushes $i$, $k$ and $i^1$, $k^1$, respectively. Both parts of the commutator rotate synchronously with the magnet poles N and S.

The machine works in the following manner:

If the half B be considered and if it be assumed that the pole N is rotating in the direction indicated by the arrow, the flow of the magnetic flux through the iron cores of the windings $B^2$ and $B^4$ increases, while the flow of magnetic flux through the iron cores of the windings $B^1$ and $B^3$ decreases. This flux increases or decreases continuously until the magnet pole N has rotated nearly 45°, and is then kept constant during a corresponding period, for instance by giving the pass-over surfaces for the flow of the magnetic lines of force between stator and rotor a shape suitable for this purpose, an example thereof being shown in Fig. 5 and more fully described in the following. When the magnet pole N is rotated past the said position the flow lines of force through the iron cores of the windings $B^2$ and $B^4$ decreases while increasing in the iron cores of the windings $B^1$ and $B^3$. The magnet pole N being rotated, voltages are generated in the windings $B^1$, $B^2$, $B^3$ and $B^4$, and these voltages may be added to each other by means of series connection.

What has been said above with respect to the half B of the stator is also applicable to the half A of the stator, the windings $A^1$ etc. of which together with the iron cores thereof are displaced 45° in relation to the windings of the half B.

The flow of lines of force through an iron core in the half A and in the half B respectively will apparently vary in such a manner that alternating voltages are obtained. As a result of the manner of coupling and the nature of the commutator C rotating synchronously with the magnet poles N and S the electromotive forces generated in the respective halves of the machine are rectified and added and direct current is obtained from the terminals K and $K^1$.

The electric machine corresponding to the diagram of connections described above is shown more in detail in Figs. 2–4. In these figures 10 is a shaft, which is preferably manufactured of a non-magnetic material. On this shaft 10 is fixed an iron core 11 surrounded by a winding 12, by means of which a magnetic flux is generated in the iron core 11. The one end 13 (see Figs. 3 and 4) of the iron core 11 will then form a north pole and the other end 14 a south pole (preferably laminated), each of which rotates in one half of the stator arrangement, which has been described above in connection with Fig. 1. In each of these halves preferably laminated iron cores 15 are arranged, around which the armature windings 16 (corresponding to the windings 1, 2, 3 and 4 in Fig. 1) are arranged. The magnetic lines of force will flow through the machine in accordance with the dotted line shown in Fig. 2, and the rotor 11, 13, 14 being rotated, alternating voltages will be generated. The stator housing is provided on its right side with a case 17 for receiving a commutator arranged on shaft 10 and of the kind described in connection with Fig. 1, the construction of which may be of any known kind. The field winding 12 may be coupled with the rotating iron core 11 or may also be stationary, so that it does not take part in the rotation. This latter construction has the advantage that a direct current machine is obtained, in which no windings take part in the rotation, all of them being stationary.

The commutator may work in air, in any other gas of atmospheric or higher pressure, in a high vacuum or in a liquid, for instance oil.

The commutator must of course be constructed in such manner that the changing does not take place suddenly but during a certain interval of time.

In order to obtain a desired variation of the flow of lines of force through the different cores of the stator the surfaces of the stator and rotor operative in the transmission of the lines of force are given a special form. Fig. 5 shows schematically how these surfaces may be dimensioned. In this figure said surfaces and the space between them are developed in a plane; $m$, $m^1$, $m^2$ and $m^3$ are the four pass-over surfaces of the stator pole pieces, $n$, $n^1$ are the pass-over surfaces of the rotor pole pieces and $o$ the gap between the stator pole pieces. The rotor surfaces $n$ and $n^1$, respectively, equal the sum of a stator pole piece surface $m$, $m^1$, $m^2$ and $m^3$, respectively, and the surface of the gap $o$ between two stator pole pieces. In order to obtain a preferred form of voltage curve the rotor surface $n$ must not be rectangular, that is congruent with a surface $m$ plus a gap $o$, but can for instance, as shown in the figure, be composed of an elongated hexagonal surface. Of course the pass-over surfaces of the rotor pole pieces may have other shapes, for instance rhomboidic etc. if only the greatest length $y$ of the surface is greater than the sum $x$ of the length of a stator pole piece $m$ and the length of a gap $o$.

In the embodiment shown the gap between the stator pole pieces is as great as a stator pole piece itself, but also other ratios between these two surfaces may be used, depending among other things on the number of stator pole pieces.

The stator pole pieces and the rotor pole pieces are, of course, preferably of the same width in order to avoid ineffective surfaces.

In order to obtain a satisfactory current reversal special precautions must be taken which may be of different kinds.

For example the machine may be provided with arrangements which form magnetic circuits of such nature that the magnetic resistance in the circuit is varied during the commutating period and thus the flow of lines of force altered in such manner that a desired current reversal is obtained.

The embodiment of an electric machine according to the invention as shown in Figs. 6–9 is based on the last mentioned principle. In Fig. 6 A, B, C, K, $K'$, S, N, $e$, $f$, $g$, $h$, $i$, $k$, $e^1$, $f^1$, $g^1$, $h^1$, $i^1$, $k^1$, 1, 2, 3 and 4 denote the same parts as in Fig. 1 and in Figs. 7–9; 10, 11, 12, 13, 14, 15, 16 denote the same parts as in Figs. 2–4.

In this embodiment the north and south poles N and S are congruent with but displaced 45° in relation to each other, whereas, as distinct from the embodiment shown in Figs. 1–4, the two halves of the stator are not displaced in relation to each other, but the corresponding iron cores in both halves are made in one piece. The iron cores 15 are connected with each other by means of an iron ring 40 which preferably is laminated. In this case the two halves of the machine are on opposite sides of a plane of symmetry going through the ring 40 at right angles to the plane of the paper.

On the commutator housing 41 an auxiliary stator is arranged consisting of two pairs of iron cores 42 and $42^1$, displaced 90° in relation to each other and mounted some distance from each other in an axial direction. The iron cores are provided with windings 43, 44, 45 and 46 and cooperate each with a rotor 47 and $47^1$, respectively, mounted on the shaft and displaced 45° in relation to each other, see Fig. 6. The windings 43 and 44 are arranged on the stator pole pair 42 and the windings 45 and 46 on the stator pole pair $42^1$. The rotor 47 cooperates with the stator pole pair 42 and the rotor $47^1$ with the stator pole pair $42^1$. One half 42, 43, 44, 47 of the current reversing arrangement thus obtained lies in the plane XII—XII in Fig. 7 and is more clearly shown in Fig. 8, while the other half $42^1$, 45, 46, $47^1$ lies in the axially displaced plane XII'—XII'. As will be seen from the diagram of connection shown in Fig. 6 the windings 43, 45 constitute exciting windings and are supplied with main current, while the windings 44 and 46 constitute armature windings and are supplied with current from the respective stator halves. When the current in one half of the machine is to be reversed the rotor $47^1$ of this half will pass in between the corresponding pole pair in the auxiliary stator and as a result hereof the magnetic resistance will be altered in the circuit comprising the iron cores of the windings, and in this way a change of the flow of lines of force within the auxiliary circuit will occur, electromotive forces being induced in the windings 44 and 46, respectively, which cause a reversal of current in the respective stator halves.

In Fig. 7 the numerals 54 and 55 represent the commutator device C shown in Fig. 1, the numerals 50, 51 and 52, 53, respectively, designating two pairs of slip rings, the rings 50 and 51 of which are connected to the slip ring segments $e'$, $g'$ and $h'$, $f'$, respectively, of the commutator device C; whereas the slip rings 52 and 53 are to be connected to the commutator segments $e$, $g$ and $f$, $h$, respectively, of the device C, the armature windings 16 being connected to brushes (not shown) cooperating with said slip rings 50 to 63, respectively.

The housing 41 forms a closed chamber about the commutator and slip rings and is adapted to receive a gas of atmospheric or higher pressure, a liquid such as oil, or may be evacuated as may be required to provide a medium of high dielectric strength.

This embodiment according to the invention in which the longitudinal axes of the iron cores of the stator are parallel to the rotor shaft is specially suited for generation of direct current of very high voltage; the generating windings may then be submerged in oil.

When the machine is working as a generator the voltage generated is dependent on the strength of the rotor fluxes and in the manner of connection of the various windings.

The working of the machine as a motor, the generating windings then being motor windings, will be understood without further explanation from the foregoing description. If the moments which the shaft of the rotor has to overcome are altered, the speed of revolution will apparently also be altered unless suitable precautions are taken. By a suitable alteration of the ampere turns of the stator or the rotor windings or both the speed may be regulated or kept constant.

The invention is not limited to the embodiments above described, which have been chosen only in order to illustrate the principle of the invention.

In Figs. 10–15 is shown the application of the invention to a direct current transformer, i. e. an arrangement for transformation of electric energy of a certain voltage to electric energy of a different voltage.

For this purpose the transformer is provided with motor windings, to which is applied a certain unidirectional voltage, and also with generating windings, in which two or several alternating currents are generated, which in a certain finite interval of time equal zero, said interval of time being utilized for changing over the generating windings so that a unidirectional voltage of a different value than the voltage applied is obtained. The motor (primary) windings and the generating (secondary) windings may either be separated from each other as shown in Fig. 11 or connected together as shown in Fig. 12, and they may be provided with one or several terminals in order that the transformer may be used for different ratios as is also shown in Fig. 12.

The alternating currents generated in the secondary windings are preferably, as before, phase-displaced relatively to each other in such manner, that the numerical sum of the voltage values is constant or nearly so, rectification preferably being obtained by means of a similar commutator device as already described, consisting of a number of separate commutators equal to the number of generating windings. For the supply of the primary unidirectional voltage a number of separate commutators may likewise be provided corresponding to the number of motor windings. The motor windings as well as the generating windings are to be stationary.

In the diagram shown in Fig. 10, N is a rotating north pole and S a rotating south pole rotating in synchronism, for instance by being mechanically connected to each other. The magnetic flux may be obtained by means of a winding of any known kind or the poles may also be poles of permanent magnet. The stator comprises two fundamentally identical halves A and B phase-displaced a certain angle relatively each other, for instance 45° as shown in the figure. The motor windings 1, 2, 3 and 4, are distributed on the two stator halves. Within these windings are iron cores through which the magnetic flux passes when the poles N, S have an appropriate position. The windings 1, 2, 3 and 4 in each stator half are connected with each other and connected to a commutator C. This latter comprises two parts, each consisting of four segments $e, f, g, h$ and $e^1, f^1, g^1, h^1$, respectively, separated from each other. The diametrically opposed segments in each commutator part are connected with each other, and the stator windings 1, 2, 3 and 4, connected in series in groups, are joined to these connections. Brushes $i$ and $k$ and $i^1$ and $k^1$, respectively, rest against the commutator segments. The two brushes $i$ and $i^1$ are connected to each other, while the brushes $k$ and $k^1$ are connected each to one of the contact terminals K and $K^1$.

This arrangement is identical for example with the arrangement shown in Figure 1 for transformation of mechanical energy to electrical energy or vice versa.

In the direct current transformer shown in Figure 10 there is provided on both sides of the stator halves A and B two further groups of windings $1_1, 2_1, 3_1$ and $4_1$, one on each stator half, said windings being connected to a commutator $C_1$. The commutator $C_1$ likewise comprises two parts, each consisting of four segments $e_1, f_1, g_1, h_1$ and $e_1^1, f_1^1, g_1^1, h_1^1$ separated from each other in each group connected together two and two and connected to the windings $1_1, 2_1, 3_1$ and $4_1$ on the two stator halves in the same manner as described above in regard to the commutator C. In addition brushes $i_1$ and $i_1^1$, $k_1$ and $k_1^1$ are provided resting against the commutator parts, the two first mentioned of said brushes being connected with each other, while the two latter are connected to contact terminals $K_1$ and $K_1^1$.

It is now assumed that he parts first described, i. e. the parts the references of which have no lower indexes, represent the primary side of the machine or the transformer, while the parts described thereafter and having lower indexes represent the secondary side of the transformer.

If a constant voltage is applied to the terminals K and $K^1$ of the primary side, the rotor N—S will of course rotate. With this movement a varying magnetic flux, as a result of the magnetizing winding of the rotor, will flow through each stator core. This flow will induce in the secondary windings $1_1$—$4_1$ alternating voltages varying in the same manner as above described, or, in other words, the arrangement will work as a motor generator, the winding groups 1—4 of the primary side representing motor windings and the winding group $1_1$—$4_1$ of the secondary side generating windings.

If direct current energy is supplied to the primary side direct current energy can thus be obtained on the secondary side, and the voltage of the secondary side will depend on how the parts of the machine are dimensioned.

The windings of the primary and the secondary sides may be connected in different ways and may for instance be separated as shown in Fig. 11, where $p$ is the primary winding and $s$ the secondary winding. The windings $p$ and $s$ may also be connected together as shown in Fig. 12 and provided with several tappings, so that the transformer may be used for different ratios.

The transformer corresponding to the diagram shown in Fig. 10 is shown more in detail in Figs. 13—15. In these figures 5 is a shaft preferably made of non-magnetic material. On this shaft is fixed an iron core 6, which is surrounded by a winding 7, by means of which a magnetic flux is produced in the iron core 6. The two ends 8 and 9 of the iron core, Figs. 14 and 15, constitute the north and the south pole, respectively, and rotate each in a corresponding part B and A, respectively, in the stator arrangement, as has been described in connection with Fig. 10. In each of these halves are provided iron cores 10, around which the motor and generating windings 1—4 and $1_1$—$4_1$, respectively, are arranged. The magnetic flux will pass through the machine in accordance with the dotted line shown in Fig. 13, and when the rotor 6, 8, 9 is rotated by means of the voltage applied to the primary side voltages are produced in the secondary side $1_1$—$4_1$. The stator housing is on the left side, Fig. 14, provided with a case 11 for receiving commutators mounted on the shaft 5 of the kind shown in Fig. 10, which may be of any known kind. The two commutators may also be mounted on each side of the stator housing.

The rotor winding 7 may either be joined to the rotating iron core 6 or may also be stationary so that it will not take part in the rotation. This latter arrangement has the advantage that rotating windings may be avoided altogether.

It is evident that the arrangement described may be varied in many ways in conformity with the explanations already furnished in connection with Figs. 1—9. Auxiliary apparatus may also be used if desired.

What we claim is:—

1. A dynamo electric machine having at least two axially displaced open-coil separate armature windings, stator pole pieces peripherally displaced within axially and peripherally displaced within said armature windings, a rotor having pole pieces, the pass-over surface of a rotor pole piece being substantially equal to the pass-over surface of a stator pole piece added to the area of the adjacent intervening air gap.

2. A dynamo electric machine having at least two axially displaced open-coil generating windings and the axis thereof parallel to the axis of rotation, separate commutators connected to and corresponding in number to said generating windings, a rotor having axially displaced poles, stationary field windings surrounding said rotor, motor windings co-axial with said generating windings and commutating means for applying a certain unidirectional voltage to said motor windings and inductively producing a plurality of alternating voltages equal to zero for a definite time interval in said generating windings, said interval being utilized for changing over the generating windings so that a unidirectional voltage of different value than the voltage applied is obtained.

3. In a dynamo electric machine, a plurality of separate stationary armature windings and a corresponding number of separate commutators connected thereto, said windings being axially displaced, said axially displaced windings being peripherally displaced with respect to each other whereby different phase relations are obtained and a rotor comprising a member of magnetic material having axially displaced north and south poles, each of said poles cooperating with a correspondingly axially displaced winding.

4. In a dynamo electric machine, a plurality of separate stationary armature windings and a corresponding number of separate commutators connected thereto, said windings being axially displaced, a rotor comprising a member of magnetic material having axially displaced north and south poles, each of said poles cooperating with a correspondingly displaced winding, an auxiliary armature, a rotating member of magnetic material cooperating with said auxiliary armature to set up a voltage to assist commutation and means for utilizing the main current in said first mentioned armature windings as magnetizing current for the field associated with said auxiliary armature.

5. In a dynamo electric machine, a plurality of separate stationary armature windings and a corresponding number of separate commutators connected thereto, said windings being axially displaced, a rotor comprising a member of magnetic material having axially displaced north and south poles, each of said poles cooperating with a correspondingly displaced winding, slip rings connected to said commutators, and brushes connected to the stationary armature windings engaging said slip rings.

6. A machine of the class described having a plurality of electrically independent sets of stationary, peripherally spaced windings, said sets being axially displaced with respect to each other, a rotor of magnetic material having north and south poles axially displaced to cooperate with the respective sets of windings, a separate reversing commutator connected to each of said sets, and brushes associated with each of said commutators and adapted to be connected in external direct current circuits.

7. A machine of the class described having a plurality of electrically independent sets of stationary, peripherally spaced windings, said sets being axially displaced with respect to each other, a rotor of magnetic material having north and south poles axially displaced to cooperate with the respective sets of windings, a separate reversing commutator connected to each of said sets, and brushes associated with each of said commutators and adapted to be connected in external direct current circuits, said north and south poles being peripherally displaced with respect to their corresponding sets of windings whereby different phase relations are obtained in each of said sets.

8. A direct current transformer having a plurality of electrically independent sets of stationary, peripherally spaced windings, said sets being axially displaced with respect to each other, each set comprising a pair of independent windings adapted to constitute primary and secondary windings, a rotor of magnetic material having north and south poles axially displaced to cooperate with the respective sets of windings, a separate reversing commutator connected to each of said windings, and brushes associated with each of said commutators and adapted to connect said primary and secondary windings in different direct current circuits, said sets being operable at different voltages.

9. A machine of the class described having a plurality of electrically independent sets of stationary, peripherally spaced windings, said sets being axially displaced with respect to each other, each set comprising a pair of independent windings adapted to constitute primary and secondary windings, a rotor of magnetic material having north and south poles axially displaced to cooperate with the respective sets of winds, a separate reversing commutator connected to each of said windings, and brushes associated with each of said commutators and adapted to connect said primary and secondary windings in different direct current circuits, one of said windings being provided with taps whereby the ratio of the voltages in said primary and secondary windings may be varied.

10. A machine of the class described having a plurality of electrically independent sets of stationary, peripherally spaced windings, said sets being axially displaced with respect to each other, a rotor of magnetic material having north and south poles axially displaced to cooperate with the respective sets of windings, a separate reversing commutator connected to each of said sets, and brushes associated with each of said commutators and adapted to be connected in external direct current circuits, said windings having their axes disposed parallel to the axis of rotation of said rotor.

11. A machine of the class described having a plurality of electrically independent sets of stationary, peripherally spaced windings, said sets being axially displaced with respect to each other, a rotor of magnetic material having north and south poles axially displaced to cooperate with the respective sets of windings, a separate reversing commutator connected to each of said sets, and brushes associated with each of said commutators and adapted to be connected in external direct current circuits, said windings having their axes disposed at right angles to the axis of rotation of said rotor.

12. A machine of the class described having a plurality of electrically independent sets of stationary, peripherally spaced armature windings, said sets being axially displaced with respect to each other, a rotor of magnetic material having north and south poles axially displaced to cooperate with the respective sets of windings, the windings of each set being electrically connected together, a separate reversing commutator connected to each of said sets whereby said sets of windings are rendered independently operable, means including said commutators connecting said sets in series to form the main armature circuit, an auxiliary armature and a magnetic field member associated therewith and movable relative thereto for setting up a voltage to assist commutation, an exciting winding for said field member, said exciting winding being connected in series with said main armature circuit.

13. A machine of the class described having a plurality of electrically independent sets of stationary, peripherally spaced armature windings, said sets being axially displaced with respect to each other, a rotor of magnetic material having north and south poles axially displaced to cooperate with the respective sets of windings, the windings of each set being electrically connected together, a separate reversing commutator connected to each of said sets whereby said sets of windings are rendered independently operable, an auxiliary armature associated with said rotor and provided with a plurality of separate windings and a magnetic field member movable with respect thereto and adapted to set up voltages therein to assist commutation and means for utilizing the main armature current as magnetizing current for said magnetic field member.

14. A machine of the class described having a plurality of electrically independent sets of stationary, peripherally spaced windings, said sets being axially displaced with respect to each other, a rotor of magnetic material having north and south poles axially displaced to cooperate with the respective sets of windings, the windings of each set being electrically connected together, a separate reversing commutator connected to each of said sets whereby said sets of windings are rendered independently operable, slip rings associated with said commutators and electrically connected to the segments thereof, brushes cooperating with said stationary windings and said slip rings and means connecting said sets of windings in series comprising brushes contacting with each of said commutators and electrically connected in series.

15. A machine of the class described having a plurality of electrically independent sets of stationary, peripherally spaced windings, said sets being axially displaced with respect to each other, a rotor of magnetic material having north and south poles axially displaced to cooperate with the separate sets of windings, a separate reversing commutator connected to each of said sets, brushes associated with each of said commutators and adapted to be connected in external circuits and means whereby said commutators and brushes are operated in a medium of high dielectric strength.

16. An electric machine having at least two separate, axially displaced, stationary armature windings, axially and peripherally displaced stator pole pieces in inductive relation to said armature windings, and a rotor having pole pieces, the pass-over surface area of a rotor pole piece being substantially equal to the sum of the pass-over surface area of a stator pole piece and the area of the air gap subtended between adjacent pole pieces, the peripheral length of said rotor pole pieces being greater than the sum of the length of the pass-over surface of a stator pole piece and the gap between adjacent stator pole pieces.

17. An electric machine having at least two axially displaced generating windings with their axes parallel to the axis of rotation, separate commutators connected to and corresponding in number to said generating windings, a rotor having axially displaced pole pieces, stationary field windings surrounding said rotor, motor windings coaxial with said generating windings, commutating means for applying a certain unidirectional voltage to said motor windings and inductively producing a plurality of alternating voltages equal to zero for a definite time interval in said generating windings, said interval being utilized for changing over the generating windings so that a unidirectional voltage of different value than the voltage applied is obtained, and a casing adapted to contain a medium of high dielectric strength enclosing said commutating means.

18. A machine of the class described comprising a rotor and a stator, said stator comprising a plurality of sets of stationary armature windings, the windings of each set being peripherally spaced and one set being axially spaced with respect to another set, conductors independently connecting the windings of each set in series, said rotor comprising a north pole piece and a south pole piece, said north pole piece being disposed in inductive relation to one of said sets of windings, said south pole piece being disposed in inductive relation to another of said sets of windings, a plurality of reversing commutators, conductors connecting said sets of windings individually with different commutators and means connecting said commutators in series to form a main armature circuit, a commutating generator comprising armature windings, conductors connecting the last mentioned windings respectively to the first mentioned sets of windings, a second rotor and exciting windings therefor, said second rotor being adapted to induce in said last mentioned armature windings a voltage for compensating for the residual commutation voltage of said first mentioned windings.

19. A machine of the class described comprising a rotor and a stator, said stator comprising a plurality of sets of stationary armature windings, the windings of each set being peripherally spaced and one set being axially spaced with respect to another set, conductors independently connecting the windings of each set in series, said rotor comprising a north pole piece and a south pole piece, said north pole piece being disposed in inductive relation to one of said sets of windings, said south pole piece being disposed in inductive relation to another of said sets of windings, a plurality of reversing commutators, conductors connecting said sets of windings individually with different commutators and means connecting said commutators in series to form a main armature circuit, a commutating generator comprising armature windings, conductors connecting the last mentioned windings respectively in series with the first mentioned sets of windings, a second rotor and exciting windings therefor, said second rotor being operated in synchronism with said first mentioned rotor and adapted to induce in said last mentioned armature windings a voltage for compensating for the residual commutation voltage of said first mentioned windings.

20. A machine of the class described comprising a rotor and a stator, said stator comprising a plurality of sets of stationary armature windings, the windings of each set being peripherally spaced and one set being axially spaced with respect to another set, conductors independently connecting the windings of each set in series, said rotor comprising a north pole piece and a south pole piece, said north pole piece being disposed in inductive relation to one of said sets of windings, said south pole piece being disposed in inductive relation to another of said sets of windings, a plurality of reversing commutators, conductors connecting said sets of windings individually with different commutators and means including brushes associated with each of said commutators connecting said commutators in series to form a main armature circuit.

21. A machine of the class described comprising a rotor and a stator, said stator comprising a plurality of sets of stationary armature windings, the windings of each set being peripherally spaced and one set being axially spaced with respect to another set, conductors independently connecting the windings of each set in series, said rotor comprising a north pole piece and a south pole piece, said north pole piece being disposed in inductive relation to one of said sets of windings, said south pole piece being disposed in inductive relation to another of said sets of windings, a plurality of reversing commutators, conductors connecting said sets of windings individually with different commutators and means including brushes associated with each of said commutators connecting said commutators in series to form a main armature circuit, said sets of windings being relatively peripherally displaced with respect to their cooperating poles whereby the induced voltages are displaced in phase, said phase displacement being such that a substantially constant unidirectional voltage is obtained in said main armature circuit.

22. A machine of the class described comprising a plurality of electrically independent induced windings adapted to have currents induced therein mutually displaced in phase, a separate commutator connected to each of said windings, means associated with said commutators to short circuit said windings during commutation and reversal, auxiliary commutation means adapted to supply a voltage to each of said windings to assist commutation, and means connecting said commutators in series to an external circuit whereby the voltages, rectified by said commutators, are superposed on the external circuit to produce a substantially constant uni-directional voltage.

23. A machine of the class described comprising a plurality of electrically independent induced windings adapted to have currents induced therein mutually displaced in phase, means to induce in said windings voltages having a wave form such that, when rectified, a substantially uniform, unidirectional voltage is produced therefrom, a separate commutator connected to each of said windings, means associated with said commutators to short circuit said windings during commutation and reversal, auxiliary commutation means adapted to supply a voltage to each of said windings to assist commutation, and means connecting said commutators in series to an external circuit whereby the voltages, rectified by said commutators, are superposed on the external circuit to produce a substantially constant uni-directional voltage.

24. In combination, a plurality of open coil induced windings, means to induce therein voltages relatively displaced in phase, independent means to commutate and rectify the voltages in each winding, means to supply to each winding a voltage adapted to assist commutation, and means connecting the commutating means in series to an external circuit whereby the instantaneous voltages in all of said windings are added to produce a substantially uniform unidirectional voltage.

25. An electric machine of the class described comprising a rotor and a stator, said stator comprising a plurality of sets of stationary armature windings, the windings of each set being peripherally spaced and one set being axially spaced with respect to another set, conductors independently connecting the windings of each set in series, said rotor comprising a north pole piece and a south pole piece, said north pole piece being disposed in inductive relation to one of said sets of windings, said south pole piece being disposed in inductive relation to another of said sets of windings, a plurality of reversing commutators, conductors connecting said sets of windings individually with different commutators and means connecting said commutators in series to form a main armature circuit, a commutating generator comprising armature windings, conductors connecting the last mentioned armature windings respectively in series with the first mentioned windings, a second rotor and exciting windings therefor, said second rotor being operated in synchronism with said first rotor, said exciting winding being connected in series in said main armature circuit whereby a voltage is generated in said second armature windings for compensating for the residual commutation voltage of said first mentioned armature windings.

In testimony whereof we affix our signatures.

BALTZAR CARL von PLATEN.
LARS ARVID GUNNAR REILAND.